(No Model.)
E. C. CONVERSE.
TUBE COUPLING.
No. 283,973. Patented Aug. 28, 1883.
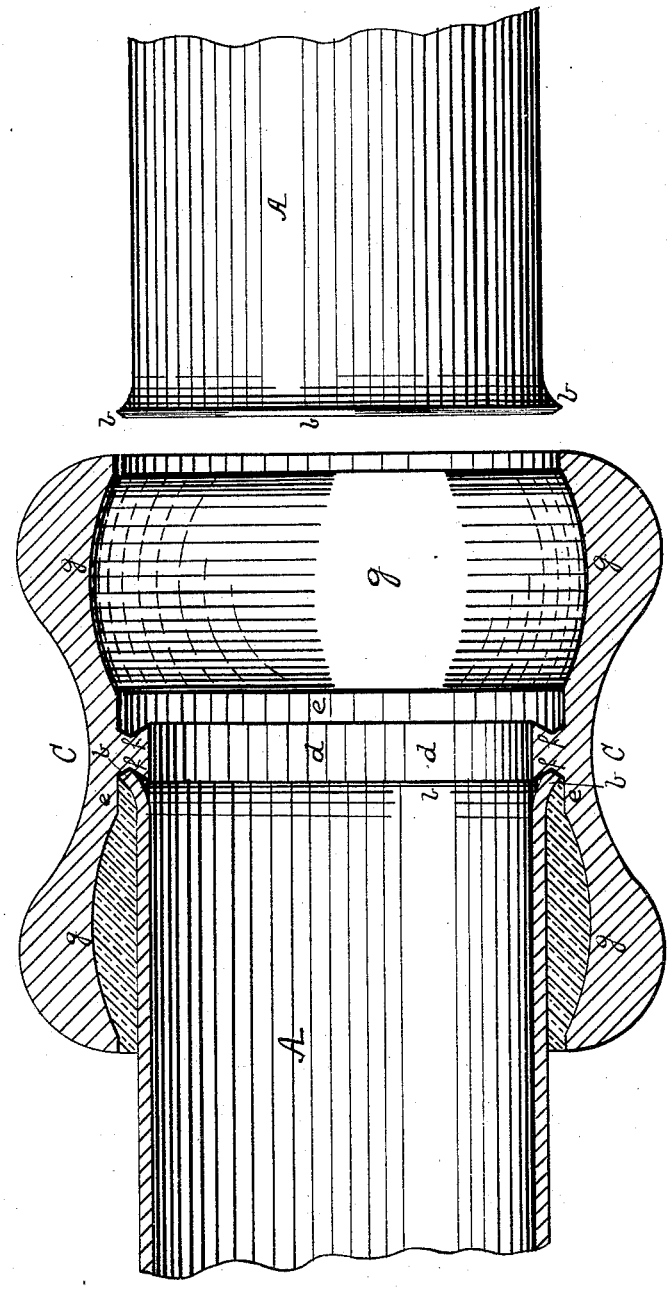

UNITED STATES PATENT OFFICE.

EDMUND C. CONVERSE, OF PITTSBURG, PENNSYLVANIA.

TUBE-COUPLING.

SPECIFICATION forming part of Letters Patent No. 283,973, dated August 28, 1883.

Application filed March 8, 1883. (No model.)

*To all whom it may concern:*

Be it known that I, EDMUND C. CONVERSE, of Pittsburg, in the county of Allegheny and State of Pennsylvania, have invented a new and useful Improvement in Tube-Couplings, (Case C;) and I do hereby declare the following to be a full, clear, and exact description thereof.

My invention relates to couplings used for connecting thin or light wrought-metal tubing, its object being to provide an efficient coupling for this light-metal tubing, whereby the several lengths of tubing can be connected without cutting into or weakening it, as is the case where the ordinary screw-threaded couplings or sockets are employed.

In Letters Patent granted to me January 10, 1882, June 13, 1882, and September 5, 1882, are shown coupling devices for connecting this tubing; but my present invention relates to another means for connecting this light-metal tubing.

It consists, essentially, in combining with a coupling collar or sleeve provided with annular inwardly-flaring calking-recesses at each end metal tubing having annular lips flared at the ends thereof and adapted to fit within the collar, so that the tubing will be held within the collar by means of the calking material confined between the annular flared lip thereof and the inwardly-flaring sides of the calking-recess.

It also consists in providing the coupling-collar with an inner central ring having dovetailed sides, within which the flared lips of the tubing fit, so as to form the inner surface of the tubing and coupling substantially flush, and prevent the formation of side currents in the fluid passing through on account of any large annular depression at the joint.

To enable others skilled in the art to make and use my invention, I will describe the same more fully, referring for that purpose to the accompanying drawing, which represents a sectional view of the coupling, showing one tube-section connected therein and another tube-section in full lines, ready to enter the coupling.

In the drawing, A represents the tubing to be coupled, this tubing being what is termed "light-metal tubing," being formed of thin wrought metal, and being too thin and light to receive the ordinary screw-thread employed to connect the ordinary wrought-metal tubing. The ends of the tubing are flared out by suitable tools or machinery, so as to form the annular lips b, which extend out a short distance beyond the circumference of the tubing. The coupling collar or sleeve C is preferably formed of cast metal, and has the inner central ring, d, and the inner faces, e, on each side thereof, these inner faces corresponding in diameter to the diameter of the flared lips on the end of the tubing. The sides f of the central ring, d, are formed dovetailed, so that the lips b may fit into these dovetailed sides and under the central ring, the ring extending out, so as to form the inner surface of the tubing and ring substantially flush or smooth. Between the inner faces, e, and the mouths or ends of the collar are the annular calking-recesses g, for the reception of lead or other suitable calking or packing material, the calking-recesses being inwardly flaring, and being of larger diameter at the base, or between the base and mouth, than at the mouth, so as to receive a thicker or larger body of metal below the mouth than at the mouth of the coupling.

In connecting tubing by my improved coupling the tube-sections are inserted within the collar, so that the annular flared lips b fit against the central ring, d, and within the dovetailed sides f thereof, and the melted lead or other calking material is poured and calked or packed within the annular inwardly-flaring calking-recesses g, and the coupling is made. The calking material fits against the annular flared lips b within the inner faces, e, and calking-recesses g, and thus holds the lips against the central ring by the mass or large body of metal confined between these lips and the inwardly-flaring sides of the calking-recesses, making a secure joint against longitudinal or drawing strains. The flaring of the lips on the ends of the tubing does not seriously weaken them against internal-pressure strain, and the lips are protected from such pressure by the central ring, under which they fit, and the calking material surrounding the tubing within the collar above the flared lips, where the metal of the tubing is intact. As the central ring extends over the flared lips of the tubing, there is but a slight irregularity of the inner surface of the tubing and ring, the surface being as smooth as can be obtained with the flared lips, and not such as to create increased friction of the fluids passing through the tubing, as is the case where there is a large annular space between the ends of the tubing, by which riffles or side currents are formed.

What I claim as my invention, and desire to secure by Letters Patent, is—

1. In couplings for tubing, the combination, with a coupling collar or sleeve provided with an annular inwardly-flaring calking-recess at each end thereof, of thin-metal tubing having an annular lip flared at the end thereof, and adapted to be held within the collar by the calking material confined between the flared lip and the inwardly-flaring sides of the calking-recess, substantially as set forth.

2. In couplings for tubing, the combination, with tubing having an annular flared lip at the end thereof, of a coupling-collar provided with an annular calking-recess at each end, and a central ring having dovetailed sides, within which the flared lip on the tubing fits, substantially as and for the purposes set forth.

In testimony whereof I, the said EDMUND C. CONVERSE, have hereunto set my hand.

EDMUND C. CONVERSE.

Witnesses:
CHAS. C. DORR,
WM. L. HURD.